(12) United States Patent
Hasegawa et al.

(10) Patent No.: US 8,816,900 B2
(45) Date of Patent: Aug. 26, 2014

(54) RADAR DEVICE, CALIBRATION SYSTEM AND CALIBRATION METHOD

(75) Inventors: Yutaka Hasegawa, Nagoya (JP); Koji Shimizu, Ichinomiya (JP)

(73) Assignee: Denso Corporation, Kariya (JP)

( * ) Notice: Subject to any disclaimer, the term of this patent is extended or adjusted under 35 U.S.C. 154(b) by 247 days.

(21) Appl. No.: 13/467,589

(22) Filed: May 9, 2012

(65) Prior Publication Data
US 2012/0293360 A1 Nov. 22, 2012

(30) Foreign Application Priority Data
May 17, 2011 (JP) ................. 2011-110528

(51) Int. Cl.
*G01S 13/00* (2006.01)
*G01S 7/40* (2006.01)

(52) U.S. Cl.
USPC ............. 342/174; 342/70; 342/175; 342/189; 342/192; 342/194; 342/195

(58) Field of Classification Search
USPC ............. 342/70–72, 147, 149–152, 154, 158, 342/175, 189, 192, 194, 195
See application file for complete search history.

(56) References Cited

U.S. PATENT DOCUMENTS

| | | | | |
|---|---|---|---|---|
| 5,262,785 A | * | 11/1993 | Silverstein et al. | 342/162 |
| 5,359,333 A | * | 10/1994 | Withers, Jr. | 342/378 |
| 5,990,834 A | * | 11/1999 | Barrick et al. | 342/418 |
| 6,084,928 A | * | 7/2000 | Kuwahara | 375/347 |
| 6,087,974 A | * | 7/2000 | Yu | 342/62 |
| 6,480,139 B1 | * | 11/2002 | Hoctor | 342/13 |
| 6,498,581 B1 | * | 12/2002 | Yu | 342/90 |
| 6,567,034 B1 | * | 5/2003 | Yu | 342/16 |
| 7,436,351 B2 | * | 10/2008 | Struckman et al. | 342/148 |
| 7,460,835 B1 | * | 12/2008 | Petrus | 455/67.11 |
| 7,474,252 B2 | * | 1/2009 | Natsume et al. | 342/70 |
| 7,495,605 B1 | * | 2/2009 | Sakamoto et al. | 342/118 |
| 7,692,574 B2 | * | 4/2010 | Nakagawa | 342/107 |

(Continued)

FOREIGN PATENT DOCUMENTS

| | | |
|---|---|---|
| JP | 11-344517 | 12/1999 |
| JP | 2004-525535 | 8/2004 |
| JP | 2008-145178 | 6/2008 |
| WO | WO 02/25837 | 3/2002 |

OTHER PUBLICATIONS

Office action dated Dec. 9, 2013 in corresponding Chinese Application No. 201210153627.1.

*Primary Examiner* — Peter Bythrow
(74) *Attorney, Agent, or Firm* — Harness, Dickey & Pierce, P.L.C.

(57) ABSTRACT

In an environment inspection mode of a calibration system, a radar device executes a signal analysis process to calculate an eigenvalue ratio of each comparison eigenvalue. The eigenvalue ratio has a small value when a pair of eigenvalues corresponding to arrival radar waves has a strong correlation. On the other hand, the eigenvalue ratio has a large value when the eigenvalue ratio is calculated between an eigenvalue and thermal noise. When there is no eigenvalue which is not more than a reference threshold value, the radar device indicates a notice that the current environment is suitable for the calibration of the radar device. On the other hand, when there is presence of at least one eigenvalue of not more than the reference threshold value, the radar device indicates a notice that the current environment is unsuitable for the calibration of the radar device.

8 Claims, 5 Drawing Sheets

(56) References Cited

U.S. PATENT DOCUMENTS

| | | | |
|---|---|---|---|
| 7,724,181 B2* | 5/2010 | Natsume | 342/108 |
| 7,907,083 B2* | 3/2011 | Sakamoto et al. | 342/70 |
| 8,102,309 B2* | 1/2012 | Nakagawa | 342/147 |
| 8,446,312 B2* | 5/2013 | Kanamoto et al. | 342/149 |
| 2008/0224918 A1* | 9/2008 | Shimizu | 342/147 |
| 2009/0021422 A1* | 1/2009 | Abe et al. | 342/195 |
| 2010/0130873 A1* | 5/2010 | Yuen et al. | 600/484 |
| 2010/0271254 A1* | 10/2010 | Kanamoto et al. | 342/27 |

* cited by examiner

US 8,816,900 B2

RADAR DEVICE, CALIBRATION SYSTEM AND CALIBRATION METHOD

CROSS-REFERENCE TO RELATED APPLICATION

This application is related to and claims priority from Japanese Patent Application No. 2011-110528 filed on May 17, 2011, the contents of which are hereby incorporated by reference.

BACKGROUND OF THE INVENTION

1. Field of the Invention

The present invention relates to radar devices which transmit radar waves and receive arrival radar waves (or reflected radar waves) which are reflected by objects, and detect an object on the basis of the arrival radar waves. The present invention further relates to calibration systems and methods of calibrating whether or not a current environment is, in which a radar device is installed, suitable for the calibration of a radar device.

2. Description of the Related Art

There have been known radar devices having a transmitting antenna and a receiving antenna. The transmitting antenna transmits radar waves toward a front area in front of a driver's vehicle (or an own vehicle) equipped with a radar device. The receiving antenna is an array antenna composed of a plurality of antenna elements arranged in an array arrangement. The receiving antenna receives arrival radar waves (or reflected radar waves) which are reflected by objects. The radar device mounted to the own vehicle detects a distance between the radar device and an object which reflects radar waves. The radar device generates an azimuth (or an arrival azimuth) of the object on the basis of the transmitted radar waves and the received arrival radar waves. The radar device generates object information including the distance and the arrival azimuth of the arrival radar waves reflected by the object on the basis of the detected distance and the arrival azimuth of the arrival radar waves. For example, a patent document 1, Japanese patent laid open publication No. JP 2008-145178, disclosed such a conventional radar device.

Such a radar device uses a conventional method of estimating the arrival azimuth of arrival radar waves which are reflected by an object. The conventional method generates a correlation matrix which indicates a correlation between signals of the arrival radar waves received by the antenna elements of the receiving antenna. The method executes eigenvalue-decomposition of the generated correlation matrix in order to estimate the number of the arrival radar waves. The method detects the arrival azimuth of the estimated arrival radar waves on the basis of angle spectrum. There have been known methods such as MUSIC (Multiple Signal Classification) and ESPRIT (Estimation of signal Parameters via Rotational Invariance Technique) which detect such an arrival azimuth of the estimated arrival radar waves.

By the way, when the radar device is mounted to the own vehicle, it is necessary to harmonize an arrangement reference axis of the receiving antenna of the radar device with a predetermined mounting reference axis of the own vehicle. This is because the estimated arrival azimuth of radar waves in the radar device is represented by using a coordinate system on the basis of a direction of the receiving antenna. If the relationship between the coordinate system of the receiving antenna and the coordinate system of the own vehicle is not known, it is difficult to estimate the correct arrival azimuth of arrival radar waves with high accuracy.

In order to solve the above problem, a known method of calibrating the radar device mounted to a motor vehicle executes a step of detecting a correspondence between the coordinate system of the receiving antenna and the coordinate system of the motor vehicle. In a regular calibration step capable of calibrating the axis such as the mounting reference axis of the radar device and the arrangement reference axis of the receiving antenna, an calibration reflector (which is capable of reflecting radar waves) is installed at a predetermined position in an inspection environment, and a calibration system then transmits radar waves to the reflector. The radar device estimates an arrival azimuth of radar waves reflected by the reflector. Finally, the calibration system detects whether or not the arrangement reference axis of the receiving antenna of the radar device is correctly aligned with the mounting reference axis of the motor vehicle on the basis of the estimated arrival azimuth.

However, the conventional calibration system usually executes the calibration in a manufacturing factory of motor vehicles or an auto repair maintenance factory. In general, there are many objects (or various calibration obstacles) in addition to the reflector in those inspection environments, which reflect radar waves in an irradiation range of the radar device. These objects cause incorrect detection when using the calibration system.

The presence of such various calibration obstacles prevents the radar device from detecting a correct location of the reflector. In addition, the presence of these calibration obstacles causes a difficulty for the calibration system to detect whether or not the arrangement reference axis of the receiving antenna is correctly aligned with the mounting reference axis of a motor vehicle equipped with a radar device.

That is, it is necessary for the calibration system to detect whether or not the current environment is, in which the radar device is installed, suitable for the correct calibration before the calibration system detects whether or not the arrangement reference axis of the receiving antenna of the radar device mounted to the motor vehicle is correctly aligned with the mounting reference axis of the motor vehicle.

SUMMARY

It is therefore desired to provide a radar device, a calibration system, and a calibration method of calibrating whether or not a current environment is, in which a radar device is installed, suitable for the calibration of the radar device.

An exemplary embodiment provides a radar device. The radar device has a transmitting antenna, a receiving antenna and a signal processing unit. The transmitting antenna transmits radar waves toward one or more objects (or obstacles) in front of the radar device. The receiving antenna in the radar device has a plurality of antenna elements. Each of the antenna elements receives arrival radar waves (or reflected radar waves) as the transmitted radar waves reflected by an object. The signal processing unit estimates at least an arrival azimuth of an arrival radar wave and an object distance of the object on the basis of information of the arrival radar waves received through the antenna elements in the receiving antenna. The signal processing unit generates object information. For example, the object information contains the arrival azimuth of the arrival radar wave and the object distance per object which reflects the radar waves. The arrival azimuth indicates an azimuth of the arrival radar wave received by the antenna elements. The object distance indicates a distance between the radar device and the object.

The signal processing unit has an eigenvalue calculation means, a ratio calculation means, and an environment judgment means. The eigenvalue calculation means calculates a correlation matrix. The correlation matrix indicates a correlation between received signals received by each pair of the antenna elements in the receiving antenna. The eigenvalue calculation means calculates an eigenvalue of the correlation matrix. The ratio calculation means calculates an eigenvalue ratio. The eigenvalue ratio represents a ratio between the maximum eigenvalue in the eigenvalues calculated by the eigenvalue calculation means and a comparison eigenvalue which is other than the maximum eigenvalue.

The environment judgment means judges whether or not a current environment is, in which the radar device is installed, suitable for the calibration of the radar device on the basis of the eigenvalue ratio calculated by the eigenvalue calculation means.

That is, because each of the eigenvalues calculated by the radar device corresponds to a magnitude of electric power of arrival radar waves received by the receiving antenna, an eigenvalue corresponding to an arrival radar wave has a large value. On the other hand, an eigenvalue corresponding to thermal noise has a small value.

That is, the eigenvalue ratio obtained when there is presence of one eigenvalue only which corresponds to an arrival radar wave is apparently different from the eigenvalue ratio when there is presence of a plurality of eigenvalues which correspond to arrival radar waves.

Accordingly, the radar device according to the exemplary embodiment of the present invention can judge whether or not the current environment is, in which the radar device is installed, suitable for the calibration of the radar device by monitoring and checking the calculated eigenvalue ratios. As a result, when the judgment result indicates that the current environment is suitable for the calibration of the radar device, it is possible to detect with high accuracy whether or not the arrangement reference axis of the radar device is correctly aligned with the mounting reference axis of a motor vehicle.

In accordance with another aspect of the exemplary embodiment of the present invention, there is provided a calibration system. The calibration system inspects a current environment in which a radar device is located. The calibration system includes the radar device having the structure as previously described, a switching means and a notice means. The switching means is a calibration tool which instructs, when receiving a predetermined instruction through an operation unit, the ratio calculation means in the radar device to calculate the eigenvalue ratio and to judge whether or not a current environment is suitable for the calibration of the radar device. In the current environment, the radar device is located. The notice means receives the judgment result which is generated by the environment judgment means in the radar device and transmitted from the radar device. When receiving the judgment result transmitted from the radar device, the notice means provides the judgment result to outside, for example an inspector.

The inspector instructs, through the switching means such as the calibration tool, the radar device mounted on a motor vehicle in order for the radar device to execute the calibration process. The inspector receives the calibration result transmitted from the radar device and recognizes whether or not the state of the current environment is, in which the radar device is installed or located, suitable for the calibration process.

In accordance with another aspect of the exemplary embodiment of the present invention, there is provided a calibration method. The calibration method inspects whether or not a current environment is, in which a radar device is installed, suitable for the calibration of the radar device. The method uses the radar device having the transmitting antenna, the receiving antenna and the signal processing unit, as previously described. The transmitting antenna transmits radar waves toward one or more objects (or calibration obstacles). The receiving antenna has a plurality of antenna elements. Each of the antenna elements receives arrival radar waves as the transmitted radar waves reflected by the calibration object. The signal processing unit estimates at least an arrival azimuth and an object distance on the basis of information regarding the arrival radar waves received by the antenna elements. The signal processing unit generates object information. The object information contains the arrival azimuth of the arrival radar wave and the object distance per object which reflects the radar wave. The arrival azimuth indicates an azimuth of the arrival radar wave received by the antenna element. The object distance indicates a distance between the radar device and the object.

The method calculates a correlation matrix which indicates a correlation between received signals of the arrival radar waves, and calculating an eigenvalue of the correlation matrix. The method calculates an eigenvalue ratio which represents a ratio between the maximum eigenvalue in the eigenvalues and a comparison eigenvalue. The comparison eigenvalue is an eigenvalue other than the maximum eigenvalue. The method judges whether or not a current environment is, in which the radar device is installed, suitable for the calibration of the radar device on the basis of the calculated eigenvalue ratios.

This method makes it possible to correctly detect whether or not the current environment is, in which the radar device is installed, suitable for the calibration of the radar device.

In particular, in the step of judging whether or not the current environment is suitable for the calibration of the radar device on the basis of the calculated eigenvalue ratios, the number of the eigenvalue ratios which satisfy a predetermined condition is counted. One of the following processes (a) and (b) is selected:

(a) it is output that a current environment is suitable for the calibration of the radar device when the counted value regarding the number of the eigenvalue ratios is equal to a predetermined value or less than a different predetermined value which is different from the predetermined value; and (b) it is output that a current environment is unsuitable for the calibration of the radar device when the counted value is not less than the predetermined value.

This calibration method of the exemplary embodiment previously described makes it possible to provide the correct information regarding the inspection environment of the radar device to the inspector.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
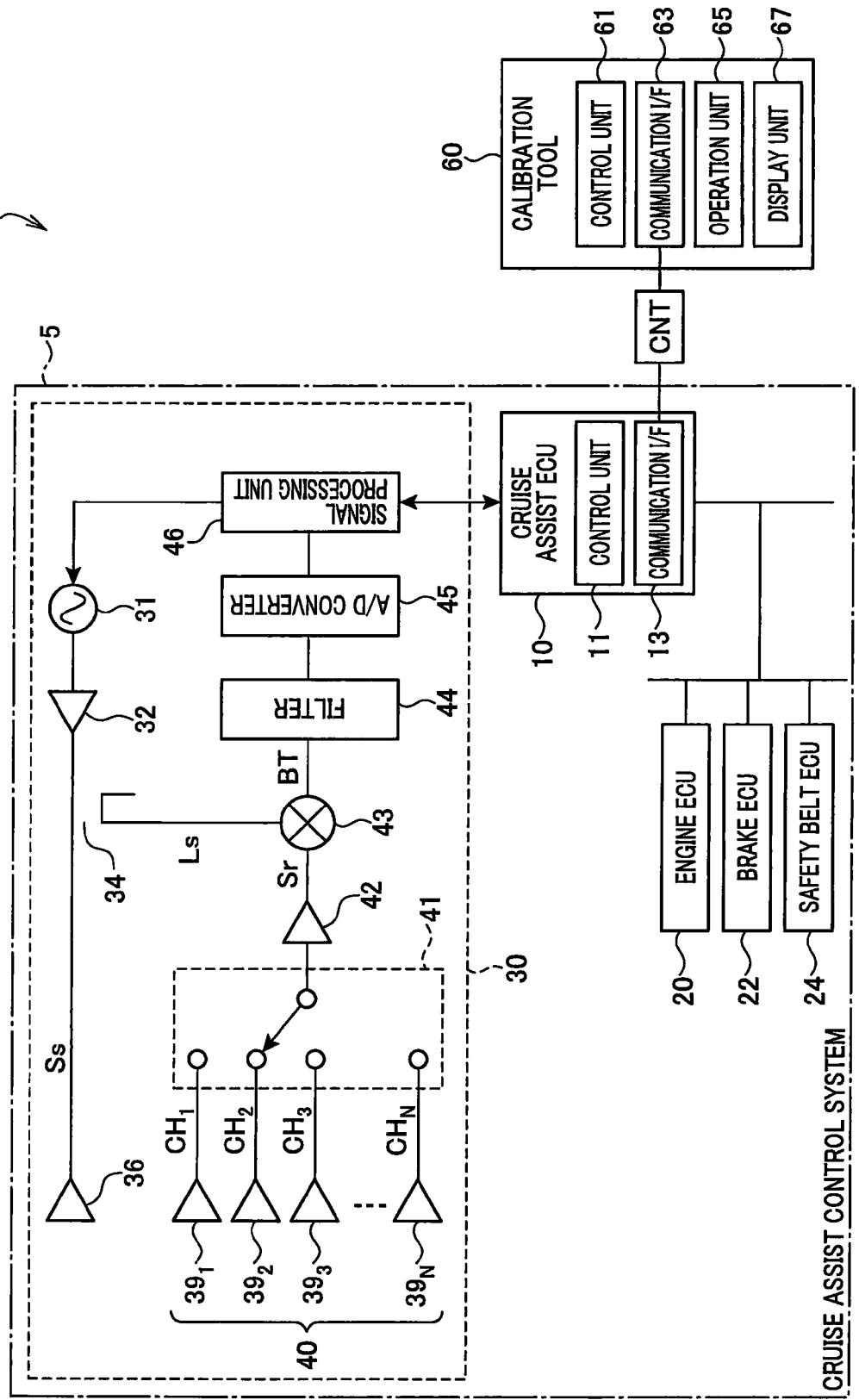
FIG. 1 is a view showing a schematic structure of a calibration system 1 having a cruise assist control system 5 and a calibration tool 60 according to an exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.
Exemplary Embodiment A description will be given of a calibration system 1 and a method of inspecting whether or not a current environment is, in which a radar device 30 is installed, suitable for the calibration of the radar device 30 mounted on a motor vehicle according to an exemplary embodiment of the present invention with reference to FIG. 1 to FIG. 5.

FIG. 1 is a view showing a schematic structure of the calibration system 1 according to the exemplary embodiment of the present invention. The calibration system 1 is composed of a cruise assist control system 5 and a calibration tool 60.

As shown in FIG. 1, the calibration system 1 is composed of the cruise assist control system 5 and the calibration tool 60. A motor vehicle is equipped with the cruise assist control system 5. The cruise assist control system 5 is composed of a radar device 30, a cruise assist electric control unit (as the cruise assist ECU) 10, an engine electric control unit 20 (as the engine ECU 20), an brake electric control unit 22 (as the brake control ECU 22), and a safety belt electric control unit 24 (as the safety belt ECU 24). The calibration system 1 executes the calibration of the radar device 30. The motor vehicle equipped with the cruise assist control system 5 will be referred to as the "own vehicle".
(Calibration Tool 60)

A description will now be given of the calibration tool 60 in the calibration system 1.

The calibration tool 60 is comprised of a microcomputer, a control unit 61, a communication interface (communication I/F) 63, an operation unit 65 and a display unit 67. The control unit 61 controls the entire operation of the calibration tool 60. The communication I/F 63 allows the calibration tool 60 and the cruise assist control system 5 to communicate with the cruise assist control system 5 shown in FIG. 1 and other devices (not shown). The operation unit 65 has various operation keys (not shown) through which the inspector or the driver of the own vehicle provides various instructions to the cruise assist control system 5 and the calibration tool 60 itself. The display unit 67 is a liquid crystal display on which displays various information are displayed
(Cruise Assist Control System 5)

Next, a description will now be given of the cruise assist control system 5.

The cruise assist control system 5 is a car-mounting system which executes a cruise assist control. The cruise assist control system 5 executes, as the cruise assist control, an adaptive cruise control and a pre-crash safety control. The adaptive cruise control keeps the distance between the own vehicle and a forward vehicle at a predetermined safety distance. Such a forward vehicle is running in front of the own vehicle on the same lane of a road, for example. The pre-crash safety control indicates or provides warning and rolls a safety belt up when the vehicle distance between the own vehicle and the forward vehicle becomes not more than a predetermined distance.

The cruise assist control system 5 is comprised of the radar device 30 and the cruise assist ECU 10. The cruise assist control system 5 transmits millimeter radio waves in millimeter band as radar waves, and receives arrival radio waves (or reflected radar waves) which are reflected by one or more objects. The cruise assist control system 5 detects an object on the basis of the arrival radio waves, and generates the information regarding the detected object. Such information will be referred to as the "object information".

The cruise assist ECU 10 controls the driving state of the own vehicle on the basis of the object information.

The exemplary embodiment uses an object which is an obstacle in driving of a motor vehicle equipped with the radar device 30. For example, such an object is present in front of the own vehicle and the object reflects the radar waves transmitted from the radar device.

The object information used in the exemplary embodiment includes at least a vehicle distance between the own vehicle and the detected object, a relative speed of the own vehicle to the object, and an azimuth of the arrival radar waves to a detection reference axis which is determined in advance. The azimuth of the arrival radar waves will be referred to as the "arrival azimuth").

The cruise assist ECU 10 is comprised of a control unit 11 and a communication interface (communication I/F) 13. The control unit 11 is comprised of a microcomputer. The microcomputer is comprised of at least a read only memory (ROM), a random access memory (RAM), and a central processing unit (CPU). Data communication is executed between the cruise assist ECU 10 and the calibration tool 60 through the communication I/F 13.

The communication interface 13 of the cruise assist ECU 10 is electrically connected to the calibration tool 60 through a connector CNT.

The cruise assist ECU 10 is connected to an alarm buzzer, a monitor, a cruise control switch, a target vehicle distance setting switch, etc. Further, the cruise assist ECU 10 is electrically connected to the engine ECU 20, the brake control ECU 22, the safety belt ECU 24, etc., through a communication bus of a local area network (LAN, omitted from the drawings).

That is, the cruise assist ECU 10 executes the cruise assist control on the basis of the object information transmitted from the radar device 30.
(Radar Device 30)

A description will now be given of the radar device 30, the environment in which the radar device 30 is installed is a calibration target by the calibration system 1 according to the exemplary embodiment of the present invention.

The radar device 30 is a millimeter wave radar device of a frequency modulated continuous wave method (MFCW method). The radar device 30 is comprised of an oscillator 31, an amplifier 32, a divider 34, a transmitting antenna 36 and a receiving antenna 40.

The oscillator 31 generates a high frequency signal in a millimeter wave band which is modulated so as to have a modulation period composed of an upward modulation section and a downward modulation section. In the upward modulation section, a frequency is linearly increased (slightly increased) in time. On the other hand, in the downward modulated section, a frequency is linearly decreased (slightly decreased) in time.

The amplifier 32 amplifies a high frequency signal generated by the oscillator 31. The divider 34 divides the output of the amplifier 32 into a transmission signal Ss and a local signal Ls. The transmitting antenna 36 emits or transmits the radar waves corresponding to the transmission signal Ss. The receiving antenna 40 is comprised of N antenna elements $39_1$ to $39_N$ which receive arrival radar waves which are reflected by objects, where N is a natural number of two or more. In particular, the N antenna elements $39_1$ to $39_N$ are arranged in array pattern. Channels $CH_1$ to $CH_N$ are assigned to the N antenna elements $39_1$ to $39_N$, respectively.

The radar device 30 is comprised of a receiving switch 41, an amplifier 42, a mixer 43, a filter 44, an analogue to digital (A/D) converter 45, and a signal processing unit 46.

The receiving switch 41 sequentially selects one of the antenna elements $39_1$ to $39_N$ which form the receiving antenna 40, and provides the received signal Sr obtained by the selected antenna element to the unit in the following stage. The amplifier 42 amplifies the received signal Sr supplied from the receiving switch 41. The mixer 43 mixes the amplifier received signal Sr amplified by the amplifier 42 with a local signal Ls, and generates a beat signal BT. The beat signal BT indicates a difference in frequency between the transmission signal S2 and the received signal Sr amplifier by the amplifier 42. The filter 44 eliminates unwanted signal components from the beat signal BT generated by the mixer 43. The A/D converter 45 executes sampling of the output data of the filter 45, and converts the sampled output data to digital data. The signal processing unit 46 detects the object, by which the radar waves transmitted by the transmitting antenna 36 are reflected, on the basis of the sampled data of the beat signal BT. The signal processing unit 46 further executes the signal analysis process in order to generate the object information of the detected object.

The signal processing unit 46 is comprised of a microcomputer, etc. The microcomputer is comprised of at least a read only memory (ROM), a random access memory (RAM), and a central processing unit (CPU), etc.

The signal processing unit 46 further has a digital signal processor (DSP) as an arithmetic processing device which executes a fast Fourier Transform (FFT).

In the radar device 30 having the above structure, the oscillator 31 oscillates and generates a high frequency signal amplified by the amplifier 32 when receiving the instruction transmitted from the signal processing unit 46. The divider 34 divides the generated high frequency signal into a transmission signal Ss and a local signal Ls. The transmitting antenna 36 transmits the transmission signal Ss as radar waves.

All of the antenna elements $39_1$ to $39_N$ receive arrival radar waves which are the radar waves as the transmission signal Ss transmitted from the transmitting antenna 36 and reflected by one or more objects. The amplifier 42 amplifies the arrival radar waves as the received signal Sr of the receiving channel CHj (i=1 to N, N is a natural number) selected by the receiving switch 41. The mixer 43 inputs the amplified received signal Sr and mixes the amplifier received signal Sr with the local signal Ls supplied from the divider 34 in order to generate the beat signal BT. The filter 44 eliminates unwanted signal components form the generated beat signal BT. The A/D converter 45 executes the sampling of the beat signal BT supplied from the filter 44. The signal processing unit 46 inputs the sampled beat signal BT supplied from the A/D converter 45.

The receiving switch 41 switches all of the channels $CH_1$ to $CH_N$ during one modulation period of a radar wave at predetermined times (for example, 512 times). The A/D converter 45 executes the sampling of the arrival radar waves in synchronization with the switch timing. That is, the sampled radar waves are stored in a memory such as the RAM every upward modulation section and downward section of the radar wave every each of the channels $CH_1$ to $CH_N$.

The radar device 30 is mounted to a motor vehicle so that the mounting reference axis of the motor vehicle is correctly aligned with the arrangement reference axis of the radar device 30. The mounting reference axis of the motor vehicle is determined in advance. The arrangement reference axis of the radar device 30 is also determined in advance. In particular, the arrangement reference axis is determined as a direction of the receiving antenna 40 when the radar device 30 is installed on the motor vehicle.

(Axis Calibration)

In general, there is a possibility of it not satisfying the predetermined condition so that the mounting reference axis of the motor vehicle is not aligned with the arrangement reference axis of the radar device 30. It is therefore necessary to inspect whether or not the mounting reference axis of the motor vehicle is correctly aligned with the arrangement reference axis of the radar device 30. This calibration will be referred to as the "axis calibration".

The entire of the calibration tool 60, the driving assist ECU 10, and the radar device 30 executes the above axis calibration. In order to execute the axis calibration process, the radar device 30 executes the signal analysis process, the cruise assist ECU 10 executes the mode switching process, and the calibration tool 60 executes the calibration process.

Specifically, the exemplary embodiment executes the axis calibration, a target object (as a reflector) is installed on a predetermined position (which will be referred to as the reference position"). The target object as the reflector is capable of reflecting the transmission radar waves. After the installation of the target object as the reflector, the radar device 30 mounted on a motor vehicle transmits radar waves. The calibration system detects whether or not an estimated arrival azimuth of an arrival radar wave is equal to a detected azimuth of the arrival radar wave. The calibration system judges whether or not the mounting reference axis of the motor vehicle is aligned with the arrangement reference axis of the radar device 30 on the basis of the comparison result between the estimated arrival azimuth of the radar wave and the actual arrival azimuth of the radar wave.

It is preferable for the axis calibration environment not to contain any object, other than the target object as the reflector, within an irradiation range of radar waves. However, there is a possibility that an object other than the reflector as the target object may exist. Therefore the axis calibration executed by the calibration system 1 verifies such an environment inspection whether or not the current environment is, in which the radar device is installed, suitable for the axis calibration.

(Signal Analysis Process)

A description will now be given of the signal analysis process executed by the signal processing unit 46 in the radar device 30.

Figure 2:
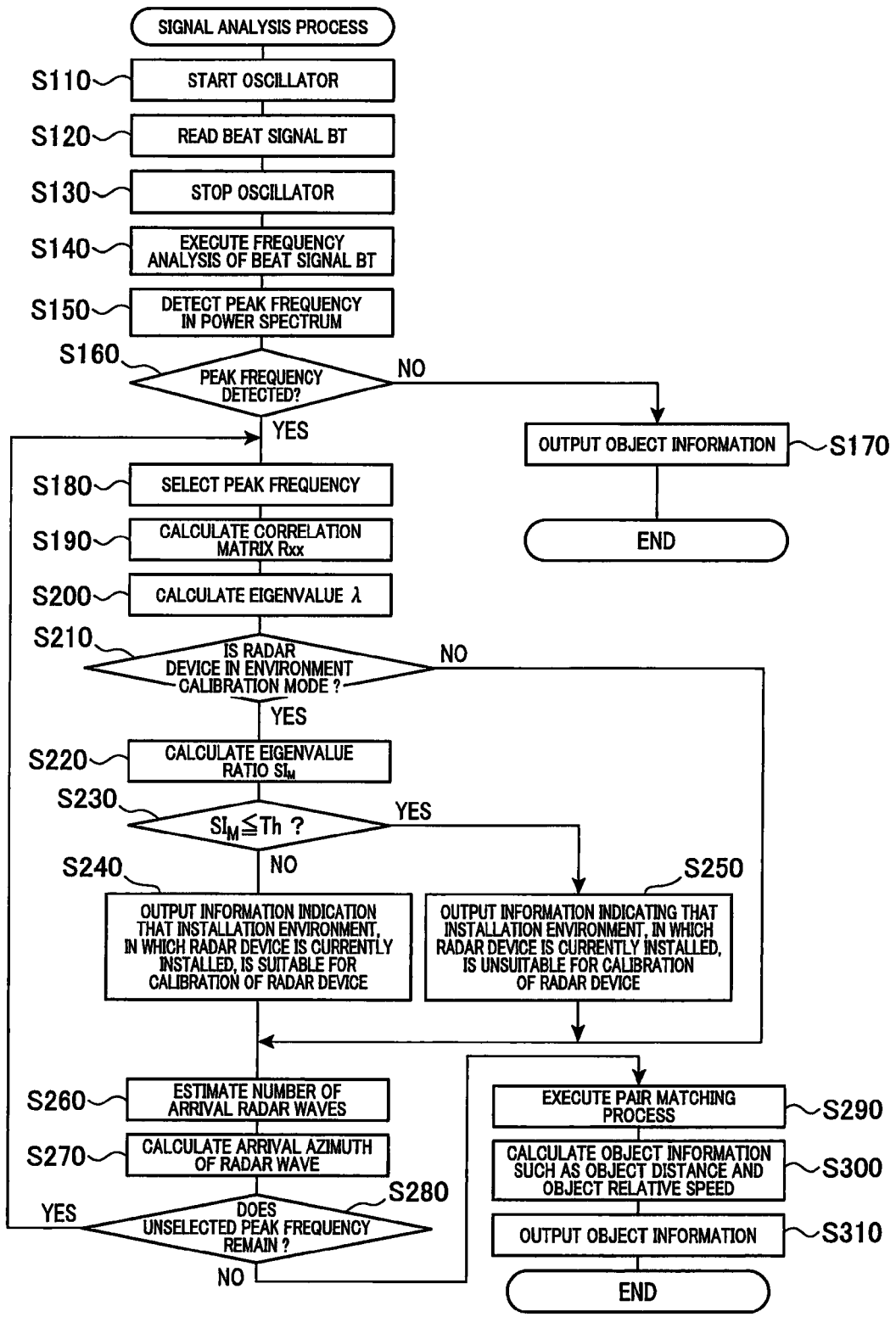
FIG. 2 is a flow chart showing a signal analysis process executed by a signal processing unit 46 in a radar device 30 of the cruise assist control system 5 according to an exemplary embodiment of the present invention.

FIG. 2 is a flow chart showing the signal analysis process executed by the signal processing unit 46 in the radar device 30 of the cruise assist control system 5 according to the exemplary embodiment of the present invention.

The signal analysis process is executed every predetermined time interval. This predetermined time interval is determined in advance. When the signal analysis process is started once, as shown in FIG. 2, the oscillator 31 starts to generate millimeter waves and the radar device 30 starts to transmits radar waves (step S110), as previously described.

Following this, the radar device 30 obtains the sampled data of the beat signal BT through the A/D converter 45 (step S120). After the sampled data of a necessary number is obtained, the operation of the oscillator 31 is temporarily stopped. This also stops the transmission of radar waves as transmission waves.

Next, the signal processing unit 46 in the radar device 32 executes the frequency analysis (as the FFT process in the exemplary embodiment) of the sampled data (namely, the beat signal BT) obtained in step S130. The frequency analysis generates a power spectrum of the beat signal BT every upward modulation section and downward modulation section per each of the receiving channels $CH_1$ to $CH_N$ (step S140).

The obtained power spectrum expresses the frequency of the beat signal BT and the strength of the beat signal at each frequency. The signal processing unit 46 detects peak frequencies $fbu_1$ to $fbu_m$ in the power spectrum during the upward modulation period and further detects the peak frequencies $fbd_1$ to $fbd_m$ in the power spectrum during the downward modulation period every receiving channel (step S150). Each of the peak frequencies $fbu_{i-m}$, $fbd_{i-m}$ indicates the possibility of the presence of an object which reflects the transmission radar wave as arrival radar waves.

Specifically, in step S150, the signal processing unit 46 adds all of the power spectrums every receiving channels CH, and calculates an average spectrum of the addition result. The signal processing unit 46 detects as the peak frequency fbu, fbd, the frequency which corresponds to the peak frequency in the average frequency which exceeds a predetermined-set threshold value (namely, the frequency having the maximum strength in the average spectrum).

The operation flow goes to step S160. In step S160, the signal processing unit 46 detects whether or not the peak frequencies fbu and fbd are detected. The detection result in step S160 indicates that no peak frequency is detected ("NO" in step S160), the signal processing unit 46 generates the object information which indicates that no object is present in front of the own vehicle, the operation flow goes to step S170.

In step S170, the signal processing unit 46 outputs the object information to the cruise assist ECU 10. The signal processing unit 46 completes the signal analysis process. The signal processing unit 46 in the radar device 30 waits for the signal analysis process in a next detection cycle.

On the other hand, when the detection result in step S160 indicates the detection of the peak frequencies fbu and fbd ("YES" in step S160), the operation flow goes to step S180.

In step S180, the signal processing unit 46 selects a peak frequency fbu in the peak frequencies fbu obtained during the upward modulation section, and a peak frequency fbd in the peak frequencies fbd obtained during the downward modulation section, which are not processed in a series of steps S190 to S270.

The operation flow goes to step S190. In step S190, the signal processing unit 46 generates a received vector Xi(k) by using the following equation (1). The received vector Xi(k) is composed of signal components (as the data obtained by executing the FFT process) of the frequency selected in step S180, extracted from the power spectrums in all of the channels $CH_1$ to $CH_N$, and arranged in a matrix pattern. Further, on the basis of the generated received vector Xi(k), the signal processing unit 46 generates a correlation matrix Rxx(k) by using the following equation (2). The correlation matrix Rxx(k) represents a correlation between each of the received vector Xi(k).

$$Xi(k)=\{x_1(k), x_2(k), \ldots, x_N(k)\}^T \quad (1),$$

where T indicates a transposed vector.

$$Rxx(k)=Xi(k)Xi^H(k) \quad (2),$$

where "H" indicates a complex transposed matrix.

The operation flow goes to step S200. In step S200, the signal processing unit 46 calculates eigenvalue $\lambda_1 \sim \lambda_N$ (where, $\lambda_1 \geq \lambda_2 \geq \ldots \lambda_N$), and calculates eigenvectors $E_1 \sim E_N$ which correspond to the eigenvalue $\lambda_1 \sim \lambda_N$, respectively.

The operation flow goes to step S210. The signal processing unit 46 judges whether or not the operation mode of the radar device 30 is set to the environment inspection mode. The environment inspection mode judges whether or not the current environment is, in which the radar device 30 is installed, suitable to correctly execute the axis calibration.

The cruise assist ECU 10 sets the operation mode of the radar device 30 on the basis of the instruction transferred from the calibration tool 60.

In the exemplary embodiment, the cruise assist control system 5 executes the usual operation mode and the calibration mode. In the usual operation mode, the cruise assist control system 5 executes the cruise assist control. In the calibration mode, the cruise assist control system 5 executes the calibration of the radar device 30. The radar device 30 executes, as the calibration mode, the environment inspection mode.

When the judgment result in step S210 indicates affirmative ("YES" in step S210), namely, indicates that the radar device 30 is in the environment inspection mode, the operation flow goes to step S220. In step S220, the signal processing unit 46 inserts the maximum egenvalue $\lambda_1$ and comparison eigenvalues $\lambda_M$ into the following equation (3) in order to calculate the eigenvalue $Sl_M$ of each of comparison eigenvalues $\lambda_M$.

The maximum eigenvalue $\lambda_1$ is the maximum eigenvalue $\lambda$ in the entire of the eigenvalues $\lambda_1$ to $\lambda_1$ calculated in step S200. The comparison eigenvalues $\lambda_M$ is the eigenvalues $\lambda$, other than the maximum eigenvalue $\lambda_1$ in the entire of the eigenvalues $\lambda_1$ to $\lambda_1$ calculated in step S200. Therefore M is within a range of 2 to M in the following equation (3).

$$Sl_M = 10 \times \log 10\left(\frac{\lambda_1}{\lambda_M}\right). \quad (3)$$

The eigenvalue ratio $Sl_M$ between a pair of eigenvalues a calculated by the equation (3) has a small value when these eigenvalues a in the pair correspond to arrival radar waves having a strong correlation. On the other hand, the eigenvalue ratio $Sl_M$ between a pair of eigenvalues a calculated by the equation (3) has a large value when one eigenvalue in the pair corresponds to an arrival radar wave and the other eigenvalue in the pair corresponds to thermal noises.

The operation flow goes to step S230. In step S230, the signal processing unit 46 judges whether or not each of the eigenvalue ratios $Sl_M$ calculated in step S220 is not more than a predetermined reference threshold value Th. That is, in step S230, the signal processing unit 46 checks whether or not there is presence the egenvalue ratio of not more than the predetermined reference threshold value Th in the eigenvalue ratios $Sl_M$ calculated in step S220.

The predetermined threshold value Th used in the exemplary embodiment is a threshold value which is determined in advance as a value which at least corresponds to a ratio to at least the maximum eigenvalue $\lambda_1$. Accordingly, it is preferable that the predetermined reference threshold value Th is smaller than the value obtained by inserting the ratio $(\lambda_1/\lambda_M)$ into the equation (3), where the ratio $(\lambda_1/\lambda_M)$ is a ratio between the maximum eigenvalue $\lambda_1$ to the comparison threshold value $\lambda_M$. Further, the exemplary embodiment uses the predetermined reference threshold value Th when the signal processing unit 46 predicts the number L of arrival radar waves.

When the judgment result in step S230 indicates there is no eigenvalue $Sl_M$ which is less than the reference threshold value Th ("NO" in step S230), The operation flow goes to step S240. In step S240, the signal processing unit 46 outputs to the cruise assist ECU 10 the information which indicates that the current environment is suitable for the axis calibration (as the "suitable environment information"). In the axis calibration, the mounting reference axis is aligned with the arrangement reference axis. When receiving the suitable environment information transmitted from the signal processing unit 46 in the radar device 30, the cruise assist ECU 10 transmits the received suitable environment information to the calibration tool 60. The operation flow goes to step S260.

On the other hand, when the judgment result in step S230 indicates that there is at least one eigenvalue ratio $Sl_M$ of not more than the reference threshold value Th ("YES" in step S230), the operation flow goes to step S250. In step S250, the signal processing unit 46 outputs to the cruise assist ECU 10 the information which indicates that the current environment is, in which the radar device is installed, unsuitable for the axis calibration (as the "unsuitable environment information"). When receiving the unsuitable environment information transmitted from the signal processing unit 46 in the radar device 30, the cruise assist ECU 10 transmits the received unsuitable environment information to the calibration tool 60. The operation flow goes to step S260.

When the judgment result in step S210 indicates that the operation mode of the radar device 30 is not the environment inspection mode, namely, is the usual operation mode ("NO" in step S210), the signal processing unit 46 does not execute the process in step S250, and the operation flow goes to step S260.

In step S260, the signal processing unit 46 estimates as the number "L" of the arrival radar waves having the eigenvalue λ of not more than a predetermined judgment threshold value in the eigenvalues $\lambda_1$ to $\lambda_N$ calculated in step S220, where L<N.

Because there are various conventional methods to obtain the number L of the arrival radar devices, a detailed explanation of these calculation methods is omitted here. The calculation methods use a value corresponding to a thermal noise power is determined as the judgment threshold value.

The following equation (4) defines noise eigenvalue vectors $E_{NO}$. The noise eigenvalue vectors $E_{NO}$ correspond to (N-L) eigenvalues of not more than the judgment threshold value. The signal processing unit 46 calculates the evaluation function $P_{MU}(\theta)$ expressed by the following equation (5). The evaluation function $P_{MU}(\theta)$ expresses a complex response $a(\theta)$ of the receiving antenna 40 in the azimuth θ observed from the forward direction of the own vehicle.

$$E_{NO} = \{e_{L+1}, e_{L+2}, \ldots, e_{L+N}\}. \quad (4)$$

$$P_{MU}(\theta) = \frac{a^H(\theta)a(\theta)}{a^H(\theta)E_{NO}E_{NO}^H a(\theta)}. \quad (5)$$

In step S270, the angle spectrum (MUSIC spectrum) obtained by the evaluation function $P_{MU}(\theta)$ is made or set so that a shape peak of the angle spectrum is generated at the azimuth θ which is equal to the direction of the arrival radar wave. The arrival azimuths $\theta_1$ to $\theta_L$ of the arrival radar waves, namely the azimuth of an object candidate can be obtained by detecting the peaks of the MUSIC spectrum.

In step S270 shown in FIG. 2, the value of the MUSIC spectrum at the arrival azimuth θ is obtained as an arrival power which expresses a received power of the arrival radar wave. The signal processing unit 46 successively stores the arrival azimuth of the arrival radar wave and the arrival power into the RAM, for example. The information containing such an arrival azimuth and an arrival power which is stored every arrival radar wave will be referred to as the "azimuth information".

The operation flow goes to step S280. In step S280, the signal processing unit 46 judges whether or not the process from step S180 to step S270 is correctly executed for each of the frequency peak values fbu and fbd, namely, whether or not a non-selected frequency peak is present. When the judgment result in step S280 indicates that there is a non-selected peak ("YES" in step S280), the operation flow returns to step S180. The signal processing unit 46 selects one of the frequency peaks fbu and fbd for which the process from step S180 to step S270 is not executed. The signal processing unit 46 executes the process from step S180 to step S270 for the selected peak.

On the other hand, when the judgment result in step S280 indicates that there is no non-selected frequency peak remaining ("NO" in step S280), the operation flow goes to step S290. In step S290, the signal processing unit 46 executes a pair-matching process. In the pair-matching process, on the basis of the estimated arrival azimuth and arrival power estimated in step S270, the signal processing unit 46 makes a pair of the frequency peak $F_{bu1} \sim _{bum}$ obtained from the beat signal BT in the upward modulation section and the frequency peak $F_{bd1} \sim _{bdm}$ obtained from the beat signal BT in the downward modulation section. This pair can be obtained by the arrival radar waves reflected by the same object, and the pair is stored in the ROM, for example.

This stored (or registered) pair of the frequency peaks fbu, fbd will be referred to as the "frequency pair".

More specifically, the signal processing unit 46 further judges whether or not a difference in each of arrival power and an arrival angle between the frequency peaks in the pair is within a predetermined allowable range. When the judgment result indicates that the obtained difference is within the predetermined allowable range, the signal processing unit 46 determines the pair of the frequency peaks is a correct frequency pair.

The operation flow goes to step S300. In step S300, the signal processing unit 46 calculates the distance (as the "object distance") between the radar device 30 and the object candidate, and the relative speed (as the "object relative speed") between the own vehicle and the object candidate on the basis of the stored frequency pair by using a conventional known method for FMCW type radar devices. At this time, the signal processing unit 46 calculates the speed of the object candidate on the basis of the object relative speed and the speed of the own vehicle, and checks whether or not the object candidate is a moving object or a stationary object.

The operation flow goes to step S310. In step S310, the signal processing unit 46 outputs to the cruise assist ECU 10 the object information regarding the object azimuth as the arrival azimuth of the radar waves of the frequency pair corresponding to each object candidate, in addition to the object distance and the object relative speed.

After this process, the signal processing unit 46 completes the signal analysis process in the flow chart shown in FIG. 2.
(Mode Switching Process)

Next, a description will now be given of the mode switching process which is executed by the cruise assist ECU 10.

Figure 3:
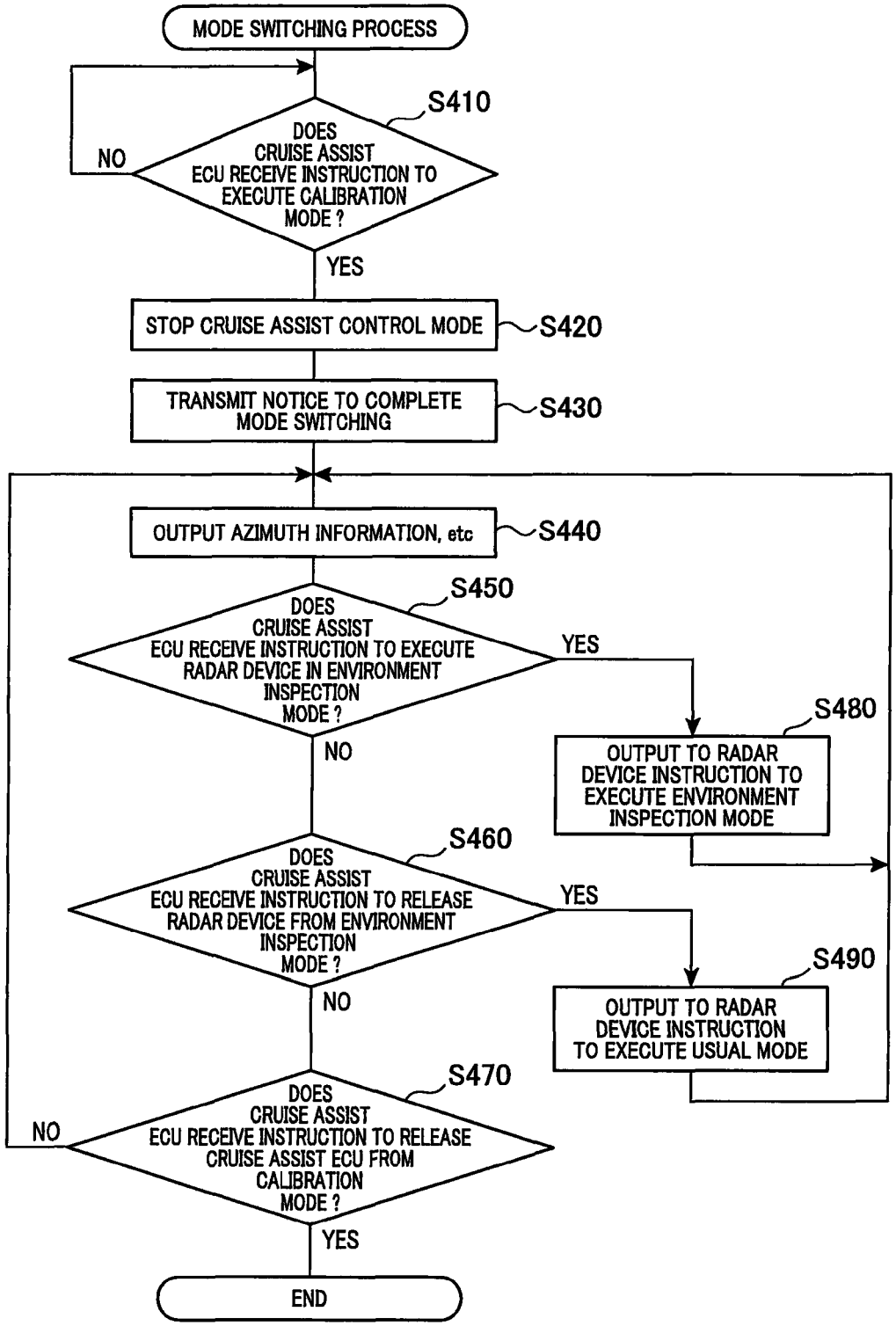
FIG. 3 is a flow chart showing a mode switching process executed by a control unit 11 in a cruise assist electric control device 10 in the cruise assist control system 5 according to the exemplary embodiment of the present invention.

FIG. 3 is a flow chart showing a mode switching process executed by the control unit 11 in the cruise assist ECU 10 in the cruise assist control system 5 according to the exemplary embodiment of the present invention.

The control unit 11 repeatedly executes the mode switching process shown in FIG. 3 during the operation of the cruise assist ECU 10.

On starting the mode switching process, the control unit 11 of the cruise assist ECU 10 detects whether or not the control unit 11 in the cruise assist ECU 10 receives a calibration mode transfer instruction transmitted from the calibration tool 60 (step S410). The calibration mode transfer instruction indicates that the calibration tool 60 enters into the calibration mode.

The judgment result in step S410 indicates that the control unit 11 does not receive any calibration mode transfer instruction ("NO" in step S410), the control unit 11 in the cruise assist ECU 10 waits to receive the calibration mode transfer instruction transmitted from the calibration tool 60.

When receiving the calibration mode transfer instruction transmitted from the calibration toll 60 ("YES" in step S410), the control unit 11 stops the execution of the cruise assist control (step S420).

The operation flow goes to step S430. In step S430, the control unit 11 transmits a mode transfer completion notice to the calibration tool 60. The operation flow goes to step S440. In step S440, the control unit 11 outputs the azimuth information contained in the object information transmitted from the radar device 30 to the calibration tool 60 (step S440).

The operation flow goes to step S450. In step S450, the control unit 11 in the cruise assist ECU 10 checks whether or not the control unit 11 has received an environment inspection mode transfer instruction transmitted from the calibration tool 60 (step S450). The environment inspection mode transfer instruction is an instruction to transfer the radar device 30 to the environment inspection mode.

The operation flow goes to step S460. In step S460, the control unit 11 checks whether or not the control unit 11 has received an environment inspection mode release instruction transmitted from the calibration tool 60 (step S460). The environment inspection mode release instruction is an instruction to release the radar device 30 from the environment inspection mode.

The operation flow goes to step S470. In step S470, the control unit 11 checks whether or not the control unit 11 has received a calibration mode release instruction transmitted from the calibration tool 60 (step S470). The calibration mode release instruction is an instruction to release the radar device 30 from the calibration mode.

When the control unit 11 of the cruise assist ECU 10 does not receive any instruction transmitted from the calibration tool 60 ("NO" in step S450, "NO" in step S460, and "NO" in step 470), the operation flow goes to step S440. In step S440, the control unit 11 continues the process of outputting the information regarding the azimuth information to the calibration tool 60.

On the other hand, when receiving the environment inspection mode transfer instruction ("YES" in step S450), the control unit 11 outputs the environment inspection mode transfer instruction to the radar device 30 (step S480) in order to execute the radar device 30 in the environment inspection mode. This makes it possible to execute the radar device 30 in the environment inspection mode. The radar device 30 detects whether or not the current environment is suitable to correctly execute the axis calibration. When receiving the detection result transmitted form the radar device 30, the cruise assist ECU 10 outputs to the calibration tool 60 the environment information regarding the detection result whether or not the current environment is suitable to correctly execute the axis calibration.

When receiving the environment inspection mode release instruction transmitted from the calibration tool 60 ("YES" in step S460), the control unit 11 outputs the usual mode instruction to the radar device 30 (step S490) in order to execute the radar device 30 in the usual operation mode.

When receiving the calibration mode release instruction transmitted from the calibration tool 60 ("YES" in step S470), the control unit 11 temporarily completes the mode switching process shown in FIG. 3. The operation flow goes to step S410. In step S410, the control unit 11 waits to input the calibration mode transfer instruction transmitted from the calibration tool 60.

(Calibration Process)

A description will now be given of the calibration process executed by the control unit 61 in the calibration tool 60.

Figure 4:
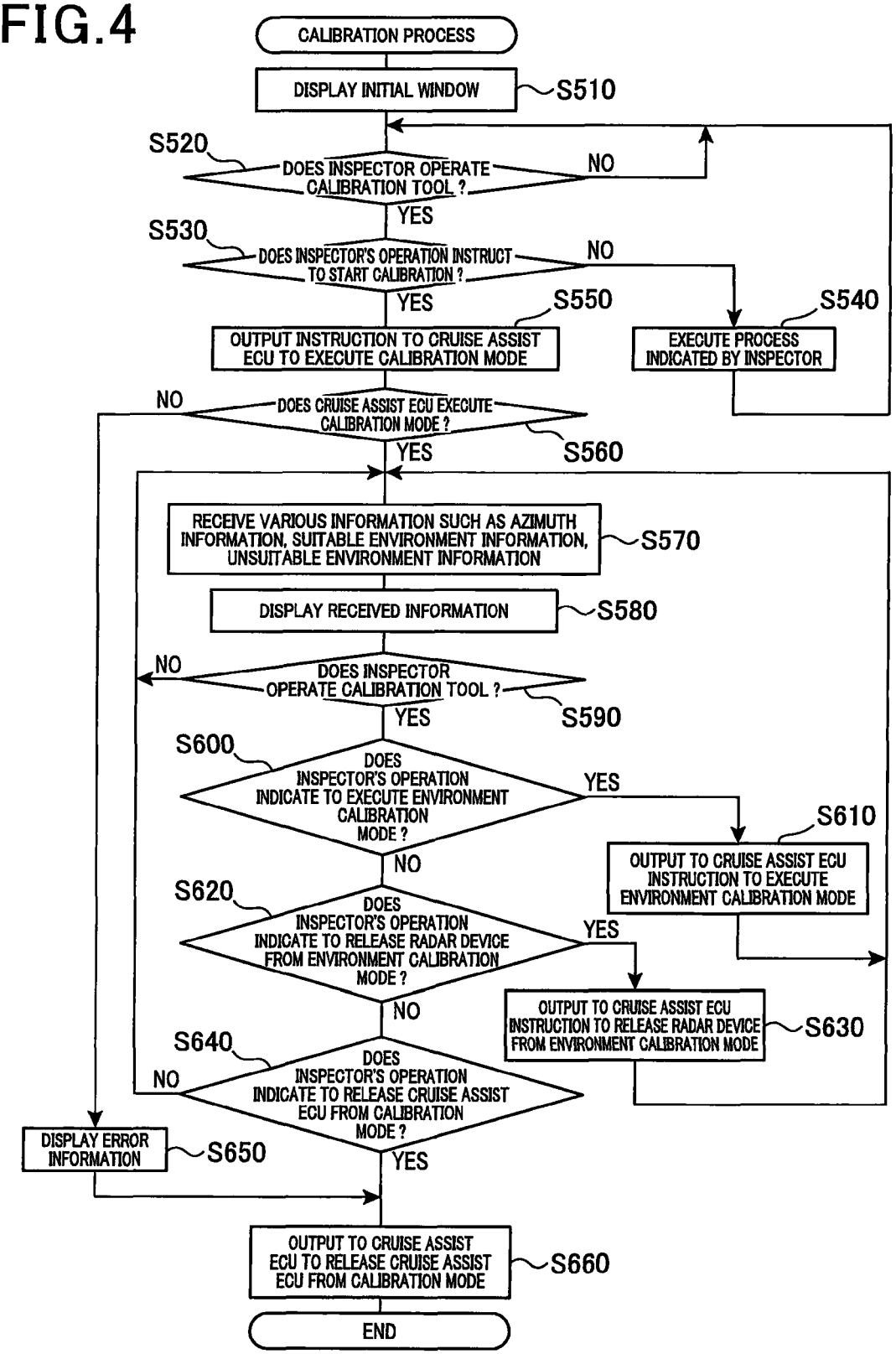
FIG. 4 is a flow chart showing a calibration process executed by a control unit 61 of the calibration tool 60 in the calibration system 1.

FIG. 4 is a flow chart showing the calibration process executed by the control unit 61 of the calibration tool 60 in the calibration system 1.

The control unit 61 of the calibration tool 60 repeatedly executes the calibration process shown in FIG. 4 immediately when a power source of the calibration tool 60 is entered once.

When the calibration process is initiated, the control unit 61 of the calibration tool 60 instructs the display unit 67 to display an initial window.

After this, the control unit 61 of the calibration tool 60 waits to receive an operation instruction transmitted from the operation unit 65. When the driver of the own vehicle operates the operation unit 65, the operation unit 65 generates and outputs such operation instruction to the control unit 61.

The control unit 61 detects whether or not the operation instruction is a calibration start instruction (step S530). When the detection result in step S530 indicates that the operation instruction is not an instruction to start the calibration of the radar device 30 ("NO" in step S530), the control unit 61 executes the received operation instruction (step S540). The operation flow returns to step S510.

On the other hand, when the received operation instruction is the calibration start instruction ("YES" in step S530), the control unit 61 of the calibration tool 60 generates and outputs the calibration mode transfer instruction to the cruise assist ECU 10 (step S550).

The control unit 61 detects whether or not the control unit 61 receives the mode transfer completion notice transmitted from the cruise assist ECU 10 within a predetermined time period counted from the time when the calibration unit 60 outputs the calibration mode transfer instruction. That is, the control unit 61 detects whether or not the mode transfer is completed (step S560).

When the detection result in step S560 indicates that the control unit 60 inputs the mode transfer completion notice within the predetermined time period ("YES" in step S560), the operation flow goes to step S570. The process in step S570 will be explained in detail.

On the other hand, when the detection result in step S560 indicates that the control unit 60 does not input any mode transfer completion notice within the predetermined time period ("NO" in step S560), the control unit 61 instructs the display unit 67 to display a message "Failure to transfer calibration mode". The operation flow goes to step S660.

When the operation flow goes to step S570, the control unit 61 receives the various information such as azimuth information, suitable environment information, unsuitable environment information transmitted from the radar device 30 through the cruise assist ECU 10 (step S570).

The control unit 61 instructs the display unit 67 to display the received information such as azimuth information, suitable environment information, unsuitable environment information transmitted from the radar device 30 through the cruise assist ECU 10 (step S580). It is possible for the display unit 67 to display a graph which shows the change in time of the arrival azimuth of the radar waves as the azimuth information.

Further, the control unit 61 detects whether or not an inspector, or the driver of the own vehicle, operates the operation unit 65 (step S590). When the detection result in step S590 indicates that the driver of the own vehicle does not operate the operation unit 65 ("NO" in step S590), the control unit 61 repeatedly executes the process in step S570 and S580. On the other hand, when the detection result in step S590 indicates that the driver of the own vehicle operates the operation unit 65 ("YES" in step S590), the control unit 61 executes the process indicated by the operation unit 65.

Specifically, when the operation to the operation unit 65 requests the transfer to the environment inspection mode ("YES" in step S600), the control unit 61 outputs the environment inspection mode transfer instruction to the cruise assist ECU 10 (step S610). The radar device 30 operates under the environment inspection mode. After the environment inspection mode is completed, the operation flow goes to step S570.

On the other hand, when the operation to the operation unit 65 requests the release from the environment inspection mode, not the transfer to the environment inspection mode ("NO" in step S600 and "YES" in step S620), the control unit 61 outputs the environment inspection mode release instruction to the cruise assist ECU 10 (step S630). This makes it possible to transfer the radar device 30 to the usual operation mode. After the calibration process is completed, the operation flow goes to step S570.

When the operation to the operation unit 65 does not indicate the transfer to the environment inspection mode and the release from the environment inspection mode ("NO" in step S600 and "NO" in step S620), and does not further indicate the release from the calibration mode ("NO" in step S640), the operation flow goes to step S570.

Further, when the operation to the operation unit 65 does not indicate the transfer to the environment inspection mode and the release from the environment inspection mode ("NO" in step S600 and "NO" in step S620), but indicates the release from the calibration mode ("YES" in step S640), the control unit 61 outputs the instruction to release the calibration mode to the cruise assist ECU 10 (step S660).

After this process, the calibration process is completed.

(Effects of the Calibration System 1 According to the Exemplary Embodiment)

In general, each eigenvalue λ corresponds to the magnitude of a power received by the receiving antenna 40 of the radar device 30. Accordingly, the eigenvalue λ has a large value when the eigenvalue corresponds to the arrival radar waves, and the eigenvalue λ has a small value when the eigenvalue λ corresponds to thermal noises.

When one eigenvalue λ corresponding to the arrival radar wave is present in the eigenvalues λ calculated in the signal analysis process in step S200, all of the eigenvalue ratios $Sl_M$ exceed the reference threshold value Th. On the other hand, when there are many eigenvalues λ corresponding to the arrival radar waves, at least one eigenvalue ratio $Sl_M$ is not more than the reference threshold value Th.

According to the calibration system 1 according to the exemplary embodiment of the present invention, it is possible to judge whether or not the current environment is, in which the radar device 30 is installed, suitable for the calibration of the radar device 30 by monitoring or checking the eigenvalue ratio $Sl_M$. The suitable environment is suitable for the axis calibration of the radar device 30, namely, has one reflector only, and no calibration obstacle.

When the judgment result indicates that the current environment is suitable for the axis calibration, the inspector detects whether or not the arrangement reference axis of the receiving antenna is equal to or correctly aligned with the mounting reference axis of the own vehicle. This makes it possible to increase the calibration accuracy.

When the detection result indicates that the arrangement reference axis of the receiving antenna is not equal to or not aligned with the mounting reference axis of the own vehicle, it is possible to adjust the position of the radar device 30 mounted to the own vehicle so that the arrangement reference axis of the receiving antenna is aligned with the mounting reference axis of the own vehicle. This makes it possible to avoid the radar device 30 from being kept in an unsuitable environment for a long period of time, in which the arrangement reference axis of the receiving antenna is not aligned with the mounting reference axis of the own vehicle.

(Modifications)

A description will now be given of various modifications of the calibration system 1 according to the exemplary embodiment.

For example, the signal analysis process previously described detects whether or not the eigenvalue ratio $Sl_M$ of not more than the predetermined reference threshold value Th is present in each of the frequency peaks fbu, fbd. When the eigenvalue $Sl_M$ of not more than the reference threshold value Th is present, the signal processing unit 46 of the radar device 30 immediately outputs the unsuitable environment information to the cruise assist ECU 10. The control unit 61 in the calibration tool 60 receives the unsuitable environment information through the cruise assist ECU 10.

However, the concept of the present invention is not limited by this structure. For example, it is possible for the signal processing unit 46 of the radar device 30 to output the unsuitable environment information to the cruise assist ECU 10 at one of the following timings (a), (b):

(a) it is detected whether or not the eigenvalue ratio $Sl_M$ of not more than the reference threshold value Th is present in all of the frequency peaks fbu, fbd detected during one modulation period. The signal processing unit 46 in the radar device 30 outputs the unsuitable environment information to the cruise assist ECU 10 at the timing when the eigenvalue ratio $Sl_M$ of not less than a predetermined value is not more than the reference threshold value Th;

(b) the signal processing unit 46 in the radar device 30 outputs the unsuitable environment information to the cruise assist ECU 10 at the timing when the eigenvalue ratio $Sl_M$ of not less than the predetermined value is not more than the reference threshold value Th after repetition of the modulation period.

In the exemplary embodiment previously described, the signal processing unit 46 in the radar device 30 estimates the number L of the arrival radar waves after the signal processing unit 46 outputs the unsuitable environment information to the cruise assist ECU 10. However, the concept of the present invention is not limited by this. It is possible for the signal processing unit 46 in the radar device 30 to complete the signal analysis process immediately when the signal processing unit 46 outputs the unsuitable environment information to the cruise assist ECU 10.

As previously described, the radar device 30 in the exemplary embodiment uses the eigenvalue ratio $Sl_M$ which is a logarithm of a ratio of the maximum eigenvalue $\lambda_1$ to a comparison eigenvalue $\lambda_M$. However, the concept of the present invention is not limited by this. It is possible for the radar device 30 to use, as the eigenvalue ratio $Sl_M$, a logarithm of a ratio $(\lambda_1/\Sigma\lambda_M)$ of a sum of the maximum eigenvalue $\lambda_1$ to comparison eigenvalues $\lambda_M$.

The present invention is not limited by the signal analysis process previously described, which is executed when the operation mode is the environment inspection mode. For example, it is possible to execute any process capable of monitoring the eigenvalue ratio $Sl_M$ and of detecting the suitable environment to execute the calibration of the radar device 30 when the operation mode is the environment inspection mode.

Figure 5:
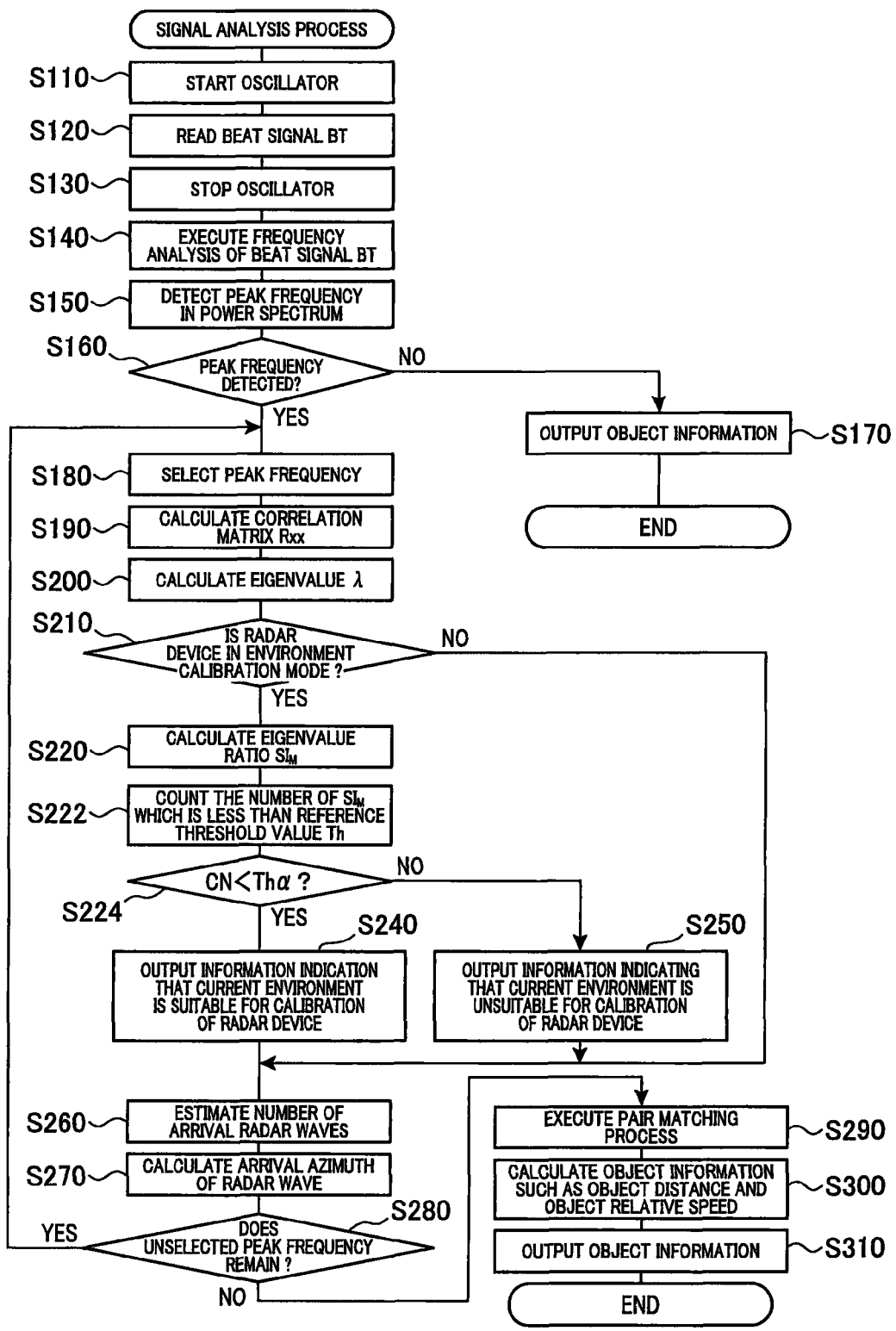
FIG. 5 is a flow chart showing a modification of the signal analysis process executed by a signal processing unit 46 in a radar device 30 of the cruise assist control system 5 according to an exemplary embodiment of the present invention.

FIG. 5 is a flow chart showing a modification of the signal analysis process executed by the signal processing unit 46 in the radar device 30 of the cruise assist control system 5 according to a modification of the exemplary embodiment of the present invention. Specifically, it is possible for the radar device 30 to execute the process in step S222 and step S224 shown in FIG. 5, instead of the process in step S230 shown in FIG. 2 during the signal analysis process.

In the signal analysis process shown in FIG. 5, the signal processing unit 46 in the radar device 30 counts the count number CN of the eigenvalue ratio $Sl_M$ of not more than the reference threshold value in step S222 following step S220. When the count number CN obtained in step S222 is less than a predetermined value Thα (Thα=1 in this modification) ("YES" in step S224), the radar device 30 outputs the suitable environment information to the cruise assist ECU 10, where the suitable environment information is suitable for the axis calibration which inspects whether or not the mounting reference axis of the own vehicle is correctly aligned with the arrangement reference axis of the radar device 30 (step S240).

On the other hand, when the count number CN obtained in step S222 is not less than the predetermined value Thα ("NO" in step S224), the radar device 30 outputs the unsuitable environment information to the cruise assist ECU 10, where the unsuitable environment information is unsuitable for the axis calibration (step S250).

The steps other than steps S222 and S224 in the flow chart shown in FIG. 5 are the same of the steps in the flow chart of the signal analysis process shown in FIG. 2. The explanation of these steps is omitted here for brevity.

By the way, the process in step S224 detects whether or not the count number CN is less than the predetermined value Thα. However, the concept of the present invention is not limited by the step S222. It is possible to detect whether or not the count number CN is equal to a predetermined value (for example, =zero).

That is, when the count number CN is equal to the predetermined value in the signal analysis process shown in FIG. 5, the signal processing unit 46 in the radar device 30 determines that the current environment is suitable for the axis calibration and generates and outputs the suitable environment information to the cruise assist ECU 10 (step S240).

When the count number CN is not equal to the predetermined value in the signal analysis process shown in FIG. 5, the signal processing unit 46 in the radar device 30 determines that the current environment is unsuitable for the axis calibration and generates and outputs the unsuitable environment information to the cruise assist ECU 10 (step S250).

By the way, the radar device according to the exemplary embodiment uses MUSIC (Multiple Signal Classification) which is a method of estimating the azimuth of an arrival radar wave. The concept of the present invention is not limited by this. It is possible for the radar device 30 to use ESPRIT (Estimation of Signal Parameters via Rotational Invariance Techniques) or Root-MUSIC instead of using MUSIC. Still further, it is possible for the radar device 30 to use one of Unitary MUSIC, Unitary ESPRIT, and Unitary Root-MUSIC.

That is, it is possible to use another method, for example, a minimum norm method which calculates a correlation matrix Rxx which represents a correlation between received radar waves in each of the antenna elements $39_1$ to $39_N$ of the receiving antenna 40, calculates an eigenvalue $\lambda$ of the correlation matrix Rss, and estimates the arrival azimuth of the radar wave on the basis of the obtained eigenvalue $\lambda$.

The radar device 30 according to the exemplary embodiment previously described has a receiving system. The receiving system is composed of the receiving antenna 40, the receiving switch 41, the amplifier 42, the mixer 43, the filter 44 and the A/D converter 45. The receiving antenna 40 has the N antenna elements $39_1$ to $39_N$. However, the concept of the present invention is not limited by this structure of the receiving system. It is possible for the receiving system not to have the receiving switch 40. In this case, it is acceptable for the receiving system to have N amplifiers $42_1$ to $42_N$, N mixers $43_1$ to $43_N$, N filters 441 to 44N, and N A/D converters $45_1$ to $45_N$. The N amplifiers $42_1$ to $42_N$ amplify the receiving signal Sr supplied from the antenna elements $39_1$ to $39_N$, respectively. The N mixers $43_1$ to $43_N$, mix local signal Ls into the received signal Sr amplifier by the amplifiers $42_1$ to $42_N$ and generate the beat signal BT, respectively. The N filters 441 to 44N eliminate unwanted signal components from the beat signal BT generated by each of the mixers $43_1$ to $43_N$. The N A/D converters $45_1$ to $45_N$ execute the sampling of the output of the filters $44_1$ to $44_N$ and convert the sampled data to digital data.

Still further, the exemplary embodiment discloses the radar device 30 as a FMCW radar device. However, the concept of the present invention is not limited by this structure of the receiving system. It is possible to apply the concept of the present invention to a pulse radar device and a dual frequency radar device. That is, it is possible for the calibration system 1 according to the exemplary embodiment to execute the calibration of any radar device if the radar device can estimate the arrival azimuth of radar waves by using the above method.

(Correspondence Between the Units Disclosed in the Explanation of the Exemplary Embodiment and the Means Used in the Claims)

The function executed in step S190 and step S200 in the signal analysis process corresponds to an eigenvalue calculation means used in the claims. The function executed in step S220 in the signal analysis process corresponds to a ratio calculation means used in the claims. The function executed in step S230 to step S250 in the signal analysis process corresponds to an environment judgment means used in the claims.

The function obtained by executing the mode switching process corresponds to the switching means used in the claims. That is, the switching means used in the claims also corresponds to the calibration tool 60 shown in FIG. 1, for example. The function executed in step S580 in the calibration process corresponds to the notice means used in the claims.

(Other Features and Effects of the Exemplary Embodiment of the Present Invention)

In the radar device as another aspect of the exemplary embodiment of the present invention, the environment judgment means judges whether or not a current environment is, in which the radar device is installed, suitable for the calibration of the radar device on the basis of a result of comparing the eigenvalue calculated by the eigenvalue calculation means with a predetermined reference threshold value. This makes it possible to certainly monitor the eigenvalue ratio with high accuracy.

In the radar device as another aspect of the exemplary embodiment of the present invention, the environment judgment means counts the number of the eigenvalue ratios which satisfy a predetermined condition. Further, the environment judgment means judges whether or not a current environment is suitable for the calibration of the radar device on the basis of the counted value regarding the number of the eigenvalue ratios.

This predetermined condition is, for example, the calculated eigenvalue ratio of not more than the reference value when the logarithm of the ratio of the maximum eigenvalue to the comparison eigenvalue is calculated. The reference threshold value is determined in advance and at least corresponds to a ratio of the maximum eigenvalue to a judgment threshold value. It is preferable that the reference threshold value is smaller than the ration of the maximum eigenvalue to the judgment threshold value. This judgment threshold value is a predetermined threshold value as a reference value to be used when the number of arrival radar waves is estimated by using a usual estimation method of estimating an arrival azimuth of such radar waves.

The radar device having the above structure and functions makes it possible to count the eigenvalue ratios which satisfy the predetermined condition and to monitor the eigenvalue ratios with high accuracy.

Still further, it is possible for the environment judgment means in the radar device to output one of: (a) the current environment is suitable for the calibration of the radar device when the counted value regarding the number of the eigenvalue ratios is equal to a predetermined value or less than a different predetermined value; and (b) the current environment is unsuitable for the calibration of the radar device when the counted value is not less than the predetermined value.

Furthermore, it is possible for the environment judgment means in the radar device to output the suitable environment information. The suitable environment information indicates that the current environment is suitable for the calibration of the radar device when the eigenvalue ratio indicates that the number of the arrival radar waves is one. It is also possible for the environment judgment means in the radar device to output the unsuitable environment information which indicates that the current environment is unsuitable for the calibration of the radar device when the eigenvalue ratio indicates that the number of the arrival radar waves is not less than two.

It is therefore possible for the radar device having the above structure to monitor the fitness of the environment to execute the calibration of the radar device.

In the radar device as another aspect of the exemplary embodiment of the present invention, the ratio calculation means calculates as the eigenvalue ratio a logarithm of a ratio of the maximum eigenvalue to the comparison eigenvalue. The environment judgment means determines that the number of the arrival radar waves is one when the calculated eigenvalue ratio, which is not more than a predetermined reference threshold value, is zero. The environment judgment means determines that the number of the arrival radar waves is not less than two when the calculated eigenvalue ratio which is not more than the predetermined reference threshold value is not less than one.

The radar device having the above structure makes it possible to certainly detect whether or not the number of arrival radar waves is one.

In the radar device according to another aspect of the exemplary embodiment of the present invention, the ratio calculation means calculates, as the eigenvalue ratio, a ratio of the maximum eigenvalue to a sum of the comparison eigenvalues. Further, the environment judgment means determines that the number of the arrival radar waves is one when the calculated eigenvalue ratio which is not more than a predetermined reference threshold value is zero. Still further, the environment judgment means determines that the number of the arrival radar waves is not less than two when the calculated eigenvalue ratio which is not more than the predetermined reference threshold value is not less than one.

The radar device having the above structure makes it possible to more certainly detect whether or not the number of arrival radar waves is one. The reference threshold value used in the radar device having the above structure is determined in advance and at least corresponds to a ratio of the maximum eigenvalue to a judgment threshold value. It is preferable that the reference threshold value is smaller than the ration of the maximum eigenvalue to the judgment threshold value. This judgment threshold value is a predetermined threshold value as a reference value to be used when the number of arrival radar waves is estimated by using a usual estimation method of estimating an arrival azimuth of such radar waves.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A radar device comprising:
   a transmitting antenna which transmits radar waves toward an object in front of the radar device;
   a receiving antenna comprising a plurality of antenna elements, each antenna element receiving arrival radar waves reflected by the object; and
   a signal processing unit which estimates at least an arrival azimuth and an object distance on the basis of information of the arrival radar waves received by the antenna elements, and generates object information which contains the arrival azimuth of the arrival radar wave and the object distance per object by which the radar wave is reflected, the arrival azimuth is an azimuth of the arrival radar waves received by the antenna elements, and the object distance is a distance between the radar device and the object,
   wherein the signal processing unit comprises:
   an eigenvalue calculation means for calculating a correlation matrix which indicates a correlation between received signals in each pair of the antenna elements in the receiving antenna, and calculating an eigenvalue of the correlation matrix;
   a ratio calculation means for calculating an eigenvalue ratio which indicates a ratio between the maximum eigenvalue in the eigenvalues calculated by the eigenvalue calculation means and a comparison eigenvalue which is an eigenvalue other than the maximum eigenvalue; and
   an environment judgment means for judging whether or not a current environment is, in which the radar device is located, suitable for the calibration of the radar device on the basis of the eigenvalue ratio calculated by the eigenvalue calculation means.

2. The radar device according to claim 1, wherein the environment judgment means judges whether or not a current environment is suitable for the calibration of the radar device on the basis of a comparison result of comparing the eigenvalue calculated by the eigenvalue calculation means with a predetermined reference threshold value.

3. The radar device according to claim 2, wherein the environment judgment means counts the number of the eigenvalue ratios which satisfy a predetermined condition, and the environment judgment means judges whether or not the current environment is, in which the radar device is installed, suitable for the calibration of the radar device on the basis of the counted value regarding the number of the eigenvalue ratios.

4. The radar device according to claim 3, wherein the environment judgment means outputs one of:
(a) the current environment is, in which the radar device is installed, suitable for the calibration of the radar device when the counted value regarding the number of the eigenvalue ratios is equal to a predetermined value or less than a different predetermined value; and
(b) the current environment is unsuitable for the calibration of the radar device when the counted value is not less than the predetermined value.

5. The radar device according to claim 1, wherein the environment judgment means outputs a suitable environment information which indicates that the current environment, in which the radar device is installed, suitable for the calibration of the radar device when the eigenvalue ratio indicates that the number of the arrival radar waves is one, and
the environment judgment means outputs an unsuitable environment information which indicates that the current environment is, in which the radar device is installed, unsuitable for the calibration of the radar device when the eigenvalue ratio indicates that the number of the arrival radar waves is not less than two.

6. The radar device according to claim 5, wherein the ratio calculation means calculates, as the eigenvalue ratio, a logarithm of a ratio of the maximum eigenvalue to the comparison eigenvalue,
the environment judgment means determines that the number of the arrival radar waves is one when the calculated eigenvalue ratio of not more than a predetermined reference threshold value is zero, and
the environment judgment means determines that the number of the arrival radar waves is not less than two when the calculated eigenvalue ratio of not more than the predetermined reference threshold value is not less than one.

7. The radar device according to claim 5, wherein the ratio calculation means calculates, as the eigenvalue ratio, a ratio of the maximum eigenvalue to a sum of the comparison eigenvalues, and
the environment judgment means determines that the number of the arrival radar waves is one when the calculated eigenvalue ratio of not more than a predetermined reference threshold value is zero, and
the environment judgment means determines that the number of the arrival radar waves is not less than two when the calculated eigenvalue ratio of not more than the predetermined reference threshold value is not less than one.

8. A calibration system which inspects an environment in which a radar device is located, comprising:
the radar device according to claim 1;
a switching means for instructing, when receiving a predetermined instruction, the ratio calculation means in the radar device to calculate an eigenvalue ratio and to judge whether or not a current environment is, in which the radar device is located, suitable for the calibration of the radar device; and
a notice means for receiving the judgment result obtained by the environment judgment means and transmitted from the radar device, and the notice means providing the judgment result to outside.

* * * * *